(12) United States Patent
Nguyen et al.

(10) Patent No.: US 12,474,272 B2
(45) Date of Patent: Nov. 18, 2025

(54) OPTICAL CAVITY SURFACE BIOCONJUNCTION USING LIPID MEMBRANES FOR LABEL FREE, ULTRASENSITIVE DETECTION OF BIOMOLECULES

(71) Applicant: Arizona Board of Regents on Behalf of the University of Arizona, Tucson, AZ (US)

(72) Inventors: Phuong-Diem Nguyen, Tucson, AZ (US); Judith Su, Tucson, AZ (US); Adley Gin, Tucson, AZ (US); Erol Ozgur, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 1061 days.

(21) Appl. No.: 17/425,243

(22) PCT Filed: Jan. 27, 2020

(86) PCT No.: PCT/US2020/015204
§ 371 (c)(1),
(2) Date: Jul. 22, 2021

(87) PCT Pub. No.: WO2020/154726
PCT Pub. Date: Jul. 30, 2020

(65) Prior Publication Data
US 2022/0091044 A1    Mar. 24, 2022

Related U.S. Application Data

(60) Provisional application No. 62/796,835, filed on Jan. 25, 2019.

(51) Int. Cl.
*G01N 21/77*    (2006.01)

(52) U.S. Cl.
CPC .............................. *G01N 21/7746* (2013.01)

(58) Field of Classification Search
CPC ................... G01N 2021/7789; G01N 21/7746
See application file for complete search history.

(56) References Cited

U.S. PATENT DOCUMENTS

| 2006/0211093 A1 | 9/2006 | Sligar et al. |
| 2009/0226887 A1 | 9/2009 | Brisson |

(Continued)

OTHER PUBLICATIONS

International Search Report and Written Opinion issued in PCT/US2020/015204 on May 21, 2020.

(Continued)

*Primary Examiner* — Natalia Levkovich
(74) *Attorney, Agent, or Firm* — Venable LLP; Henry J. Daley

(57) ABSTRACT

An optical system includes an optical resonant cavity, an optical source, an optical detector, and a signal processing circuit. The optical source is arranged to provide a source beam of light to be at least partially coupled into the optical resonant cavity. The optical detector is arranged to detect light from the source beam of light after the source beam of light has coupled into the optical resonant cavity to provide a detection signal. The signal processing circuit is configured to communicate with the optical detector to receive the detection signal. The optical resonant cavity has a bioconjugatable lipid membrane on a surface thereof. The bioconjugatable lipid membrane is functionalized to capture a specific biomolecule, and the signal processing circuit is further configured to determine a presence of the specific biomolecule when captured by the functionalized bioconjugatable lipid membrane based on processing the detection signal.

12 Claims, 8 Drawing Sheets

(56) References Cited

U.S. PATENT DOCUMENTS

| | | | |
|---|---|---|---|
| 2013/0295688 A1* | 11/2013 | Bailey | C12Q 1/6825 422/69 |
| 2015/0338346 A1 | 11/2015 | Chou et al. | |
| 2017/0120218 A1 | 5/2017 | Saavedra et al. | |
| 2017/0322207 A1 | 11/2017 | Su | |

OTHER PUBLICATIONS

Su et al., "Label-free detection of single nanoparticles and biological molecules using microtoroid optical resonators", Light: Science and Applications, (2016), vol. 5, (6 pages).

Vollmer et al., "Whispering-gallery-mode biosensing: label-free detection down to single molecules", Nature Methods, (Jul. 2008), vol. 5, pp. 591-596.

Repovsky et al., "Formation Mechanism of a Silane-PVA/PVAc Complex Film on a Glass Fiber Surface", Chem Phys Chem, (2013), vol. 14, pp. 3569-3580.

Howarter et al., "Optimization of Silica Silanization by 3-Aminopropyltriethoxysilane", Langmuir (2006), vol. 22, No. 26, pp. 11142-11147.

Kulkarni et al., "Turning the hydrophobic properties of silica particles by surface silanization using mixed self-assembled monolayers", Colloid and Interface Science, (2008), vol. 318, 372-379.

Eske et al., "Characterization of SiO2 surface treatments using AFM, contact angles and a novel dewpoint technique", Colloids and Surface A: Physicochemical and Engineering Aspects, (1999), vol. 154, pp. 33-51.

Rodriguez-Franco et al., "Effect of the transducer's surface pretreatment on SPR aptasensor development", Sensors Actuators B: Chemical, (2014), vol. 191, pp. 634-642.

Puu et al., "Planar lipid bilayers on solid supports from liposomes—factors of importance for kinetics and stability", BBA Biomembranes, (1997), vol. 1327, pp. 149-161.

Andersson et al., "Cell adhesion on supported lipid bulayers", J Biomed Mater Res A, 64A, (2003), pp. 622-629.

Tegoulia et al. "Surface Properties, Fibrinogen Adsorption, and Cellular Interactions of a Novel Phosphorylcholine-Containing Self-Assembled Monolayer on Gold", Langmuir, (2001), vol. 17, pp. 4396-4404.

Hartman et al., "Cluster size regulated protein sorting in the immunological synapse", P Natl Acad Sci USA, (Aug. 4, 2009), vol. 106, No. 31, pp. 12729-12734.

Yoo et al., "A highly sensitive plasma-based amyloid-beta detection system through medium-changing and noise cancellation system for early diagnosis of the Alzheimer's disease", Scientific Reports, (Aug. 21, 2017), vol. 7, (10 pages).

Rama et al., "Competitive electrochemical immunosensor for amyloid-beta 1-42 detection based on gold nanostructured Screen-Printed Carbon Electrodes", Sensors Actuators B: Chemical, (2014), vol. 201, pp. 567-571.

Sun et al., "Real-time detection of lipid bilayer assembly and detergent-initiated solubilization using optical cavities", Appl. Phys. Lett. (Feb. 17, 2015), vol. 106, (5 pages).

Fischer, "Amine Coupling Through EDC/NHS: A Practical Approach", M.J., Methods Mol. Biol. (2010), vol. 627, pp. 55-73.

Englund et al. "Sensitive ELISA detection of amyloid-beta protofibrils in biological samples", J. Neurochem, (2007), vol. 103, pp. 334-345.

Van Helmond et al., "Characterisation of two antibodies to oligomeric alpha-beta and their use in ELISAs on human brain tissue homogenates", J Neurosci. Methods, (2009), vol. 176, pp. 206-212.

Santos et al., "Detection of Amyloid-beta Oligomers in Human Cerebrospinal Fluid by Flow Cytometry and Fluorescence Resonance Energy Transfer", J Alzheimers. Dis., (2007), vol. 11, pp. 117-125.

Santos et al., "A Method for the Detection of Amyloid-beta1-40, Amyloid-beta1-42 and Amyloid-beta Oligomers in Blood Using Magnetic Beads in Combination with Flow Cytometry and its Application in the Diagnostics of Alzheimer's Disease", J Alzheimers Dis, (2008), vol. 14, pp. 127-131.

Peng et al., "Mobile Lipid Bilayers on Gold Surfaces through Structure-Induced Lipid Vesicle Rupture", Langmuir (Mar. 6, 2015), vol. 31, pp. 3904-3911.

\* cited by examiner

OPTICAL CAVITY SURFACE BIOCONJUNCTION USING LIPID MEMBRANES FOR LABEL FREE, ULTRASENSITIVE DETECTION OF BIOMOLECULES

CROSS-REFERENCE OF RELATED APPLICATIONS

This application in a National Stage Application under 35 U.S.C. § 371 of PCT/US2020/015204, filed Jan. 27, 2020, which claims priority to U.S. Provisional Application No. 62/796,835 filed Jan. 25, 2019, the entire contents of which are hereby incorporated by reference.

FEDERAL FUNDING

This invention was made with Government support under Grant Numbers R21 MH111109 and R03AG055020, awarded by the National Institutes of Health. The Government has certain rights in the invention.

BACKGROUND

1. Technical Field

The field of currently claimed embodiments of this invention relates to detection of biomarkers, and more particularly to detection of biomarkers using an optical cavity that has surface bioconjugation with a lipid membrane.

2. Discussion of Related Art

Amyloid-β protein has been well-known as a biomarker of interest in early detection of Alzheimer's disease. Current approaches for such detection are observing the manifestation state of cells bound with fluorescent labels, enzyme immunoassays, or DNA-based technology. These approaches have limitations such as detection time, label-dependence, and sensitivity. According there remains a need for devices for detection of biomarkers such as, but not limited to, Amyloid-β protein.

Microtoroid optical resonators have attracted increasing interest over the past few years for their capability to provide label-free and ultrasensitive detection down to single molecules. These ring-shaped resonators fabricated on a planar substrate by means of photolithography serve as an important chip-based platform, which can be integrated into devices for ultrasensitive, high-throughput biomarker screening. Microtoroid optical resonators with high quality (Q) factors will trap light at resonant wavelengths, resulting in a dip in transmission. The binding of target biomolecules onto the microtoroid surface will increase the optical pathlength, resulting in a shift towards longer wavelengths [2]. The resonant wavelength can be tracked over time to determine the number of binding events in real-time. To achieve the high Q-factor necessary for ultrasensitive biodetection, especially in real time, the surface of the microtoroid must be kept smooth to minimize the perturbation to the optical pathlength and reduce losses due to scattering during laser coupling. Silanization is the most common surface functionalization method for microtoroid resonators. However, the silane groups were shown to significantly increase the surface roughness by an order of magnitude due to the formation of non-homogenized films [3, 4, 5]. Moreover, efficient silanization of glass-based surfaces usually requires a pre-treatment step using either aqua regia or oxygen plasma to increase the number of reactive OH group, which under uncontrolled conditions usually perturbs the uniformity of the glass substrate by inducing surface etching [6, 7].

Supported lipid bilayer (SLB) platforms have been widely used as biomimetic membrane approach for studying membrane-associated interaction and cellular processes. Upon contact with an appropriate solid surface, the lipid membrane extends and forms a supported planar bilayer [8]. Due to the anti-fouling effect, lipid-based molecular assemblies have been studied in drug packaging and biochip fabrication [9, 10], ligand conjugated lipid bilayers have also served as a biomimetic cell interaction platform in drug discovery studies [11].

SUMMARY

Some embodiments are directed to an optical system for detecting specific biomolecules. In some embodiments, the optical system includes an optical resonant cavity; an optical source arranged to provide a source beam of light to be at least partially coupled into the optical resonant cavity; an optical detector arranged to detect light from the source beam of light after the source beam of light has coupled into the optical resonant cavity to provide a detection signal; and a signal processing circuit configured to communicate with the optical detector to receive the detection signal. The optical resonant cavity has a bioconjugatable lipid membrane on a surface thereof. The bioconjugatable lipid membrane is functionalized to capture a specific biomolecule, and the signal processing circuit is further configured to determine a presence of the specific biomolecule when captured by the functionalized bioconjugatable lipid membrane based on processing the detection signal.

Another embodiment of the current invention is directed to a method of detecting specific biomolecules. The method includes providing a functionalized optical resonant cavity that includes a lipid membrane coating that is functionalized to capture a specific biomolecule; contacting a sample that includes the specific biomolecule with the functionalized optical resonant cavity; providing a beam of light that is at least partially coupled into the functionalized optical resonant cavity before the contacting; detecting, before the contacting, an intensity of the beam of light for each of a plurality of wavelengths after the beam of light has passed the functionalized optical resonant cavity to obtain a first detected spectrum; providing a beam of light that is at least partially coupled into the functionalized optical resonant cavity after the contacting; detecting, after the contacting, an intensity of the beam of light for each of a plurality of wavelengths after the beam of light has passed the functionalized optical resonant cavity to obtain a second detected spectrum; and determining a presence of the specific biomolecule on the optical resonant cavity by comparing the first and the second detected spectra.

In some embodiments, a method of functionalizing an optical resonant cavity for an optical system for detecting specific biomolecules incudes providing an optical resonant cavity; providing a plurality of lipid vesicles in a suspension; and contacting the suspension containing the plurality of lipid vesicles with the optical resonant cavity such that at least some of the lipid vesicles rupture and at least partially coat a surface of the optical resonant cavity.

BRIEF DESCRIPTION OF THE DRAWINGS

Further objectives and advantages will become apparent from a consideration of the description, drawings, and examples.

FIG. 8A illustrates a real time kinetic response of increasing Dynorphin A concentrations as a function of resonant wavelength shift. FIG. 8B illustrates a dose-response curve of Dynorphin A binding to KOR proteolipid coated microcavity (average data from two consecutive recordings).

DETAILED DESCRIPTION

Figure 1:
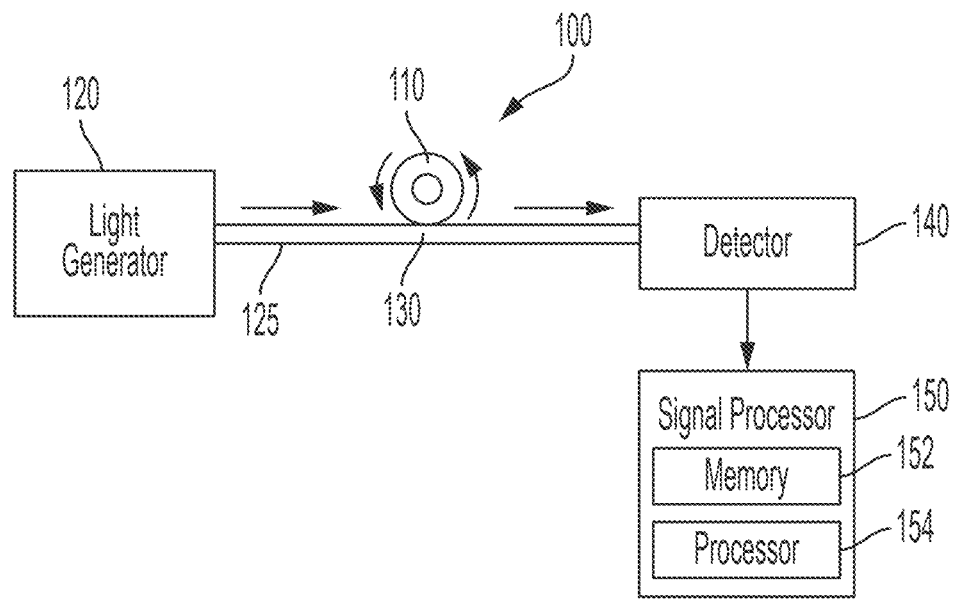
FIG. 1 is a schematic showing an optical system for detecting specific biomolecules according to embodiments of the invention.

Embodiments are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The term "light" is intended to have a broad definition that can include light in the visible as well as non-visible regions of the electromagnetic spectrum. For example, the term "light" can include, but is not limited to, visible, infrared, ultraviolet, and terahertz light. Similarly, the term "optical" has a correspondingly broad definition as with the term "light".

The term "optical resonant cavity" means a device in which light can constructively build up at resonant frequencies.

The term "optical resonant microcavity" means an optical resonant cavity that has a major length scale between 1-1000 microns.

The formation of bioconjugatable lipid membrane on microtoroid support enables a versatile functionalization technique to enhance the sensitivity and stability for ultra-sensitive detection assay. According to some embodiments of the current invention, we present a novel method of microtoroid surface functionalization using lipid vesicle rupture technique to form a unilamellar, mobile lipid bilayer coated microtoroid. In a particular, non-limiting example, the as-prepared lipid coated microtoroid was further served as biosensing platform for ultrasensitive detection of Amyloid-Beta (1-42) peptide down to attomolar level with a significant reduction in time.

Some embodiments are directed to an optical system for detecting specific biomolecules. In some embodiments, the optical system includes an optical resonant cavity; an optical source arranged to provide a source beam of light to be at least partially coupled into the optical resonant cavity; an optical detector arranged to detect light from the source beam of light after the source beam of light has coupled into the optical resonant cavity to provide a detection signal; and a signal processing circuit configured to communicate with the optical detector to receive the detection signal. The optical resonant cavity has a bioconjugatable lipid membrane on a surface thereof. The bioconjugatable lipid membrane is functionalized to capture a specific biomolecule, and the signal processing circuit is further configured to determine a presence of the specific biomolecule when captured by the functionalized bioconjugatable lipid membrane based on processing the detection signal.

In some embodiments, the optical resonant cavity has a quality factor (Q) of at least $10^4$ such that the optical system has a sensitivity sufficient for biomolecular detection. In some embodiments, the optical resonant cavity is a microtoroid optical resonant cavity and the optical source comprises an optical fiber or waveguide configured to couple light into the microtoroid optical resonant cavity by evanescent fields. The optical fiber or waveguide may be tapered or angle polished. In some embodiments, the bioconjugatable lipid membrane is stabilized using a methacrylate redox polymer scaffold. In some embodiments, a G-protein coupled receptor (GPCR) is incorporated in the bioconjugatable lipid membrane.

In some embodiments, the optical resonant cavity is a microtoroid optical resonant cavity and the optical source comprises a prism configured to couple light into the microtoroid optical resonant cavity by evanescent fields.

In some embodiments, the optical resonant cavity includes silica and a bioconjugatable lipid membrane coating on a surface of the silica. In some embodiments, the bioconjugatable lipid membrane includes at least one of soybean phosphatidylcholine, egg phosphatidylcholine, or synthetic phosphatidylcholine (DOPC, DOPE, POPC). In some embodiments, the bioconjugatable lipid membrane is functionalized with a capture agent for detecting a biomarker. In some embodiments, the capture agent is at least one of an antibody an aptamer, complementary DNA, or a protein receptor for detecting a biomarker. In some embodiments, the capture agent is specific for capturing Amyloid-β.

In some embodiments, the signal processing circuit is further configured to determine a presence of the specific biomolecule captured by the functionalized bioconjugatable lipid membrane based on processing spectral components of the detection signal.

Another embodiment of the current invention is directed to a method of detecting specific biomolecules. The method includes providing a functionalized optical resonant cavity that includes a lipid membrane coating that is functionalized to capture a specific biomolecule; contacting a sample that includes the specific biomolecule with the functionalized optical resonant cavity; providing a beam of light that is at least partially coupled into the functionalized optical resonant cavity before the contacting; detecting, before the contacting, an intensity of the beam of light for each of a plurality of wavelengths after the beam of light has passed the functionalized optical resonant cavity to obtain a first detected spectrum; providing a beam of light that is at least partially coupled into the functionalized optical resonant cavity after the contacting; detecting, after the contacting, an intensity of the beam of light for each of a plurality of wavelengths after the beam of light has passed the functionalized optical resonant cavity to obtain a second detected spectrum; and determining a presence of the specific biomolecule on the optical resonant cavity by comparing the first and the second detected spectra.

In some embodiments, a method of functionalizing an optical resonant cavity for an optical system for detecting specific biomolecules incudes providing an optical resonant cavity; providing a plurality of lipid vesicles in a suspension; and contacting the suspension containing the plurality of lipid vesicles with the optical resonant cavity such that at least some of the lipid vesicles rupture and at least partially coat a surface of the optical resonant cavity. In some embodiments of the method of functionalizing, the optical resonant cavity is an optical resonant microcavity and the plurality of lipid vesicles have an ensemble average diameter of at least 50 nm and less than 350 nm. In some embodiments of the method of functionalizing, the optical resonant cavity is an optical resonant microcavity and the plurality of lipid vesicles have an ensemble average diameter of at least 70 nm and less than 160 nm. In some embodiments of the method of functionalizing, the optical resonant cavity is an optical resonant microcavity and the plurality of lipid vesicles have an ensemble average diameter of at least 80 nm and less than 120 nm.

In some embodiments of the method of functionalizing, the providing an optical resonant cavity provides an array of optical resonant microcavities. In some embodiments of the method of functionalizing, the optical resonant cavity is an optical resonant microtoroid cavity. In some embodiments of the method of functionalizing, the array of optical resonant microcavities is an array of optical resonant microtoroid cavities. In some embodiments of the method of functionalizing, the optical resonant cavity is a hydrophilic material.

FIG. 1 illustrates an optical system 100 for detecting specific biomolecules according to some embodiments. The optical system 100 includes an optical resonant cavity 110, an optical source, which includes a light generator 120 and optical coupler 130, an optical detector 140, and a signal processing circuit 150.

The optical source, which includes the light generator 120 and optical coupler 130, is arranged to provide a source beam of light 125 to be at least partially coupled into the optical resonant cavity 110. The coupling may be achieved by the optical coupler 130, for example, through evanescent fields of the light coupling to the optical resonant cavity 110. The optical coupler 130 may be an optical fiber, or some other waveguide. The optical fiber or waveguide may be tapered or angle polished so as to provide better light coupling to the optical resonant cavity 110. The optical resonant cavity 110 may be a microtoroid optical resonant cavity, for example, or may have some other shape, such as spherical. The optical resonant cavity 110 may have an appropriate quality factor (Q) value to so as to provide a sufficient sensitivity for biomolecular detection. The Q may be, for example, at least $10^4$.

The light generator 120 may include a visible light source, or a non-visible light source such as an infrared (IR) source, or a combination. The light generator 120 may be a laser or a light emitting diode, for example.

The optical detector 140 may be arranged to detect light from the source beam of light 125 after the source beam of light has coupled into the optical resonant cavity 110 to provide a detection signal. The optical resonant cavity 110 may provide a decrease in light transmitted to the optical detector 140 at a resonant light frequency of the optical resonant cavity 110, for example. The resonant light frequency (inverse to the wavelength) may depend on the optical path of light traversed within the optical resonant cavity 110, where the optical path traversed will in general depend in part on the index of refraction of materials on the surface of the optical resonant cavity 110. The resonant light frequency therefore may be sensitive to particular biomaterials, or other materials, captured on the surface of the optical resonant cavity 110.

The signal processing circuit 150 may be configured to communicate with the optical detector 140 to receive the detection signal from the optical detector 140. The signal processing circuit 150 may include a memory 152 and a processor 154. The processor 154 may perform functions based on instructions stored in the memory 152 and based on signals received from the optical detector 140. The signal processing circuit 150 may be configured to perform functions to determine the presence of a specific biomolecule, for example.

Figure 2:
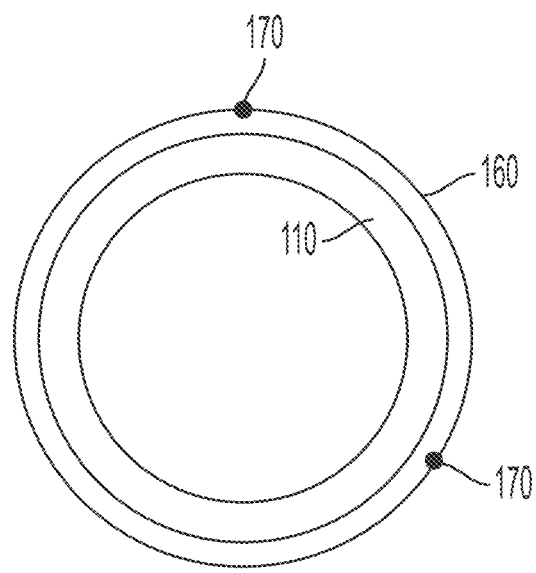
FIG. 2 is a schematic showing an optical resonant cavity including a bioconjugatable lipid membrane on a surface thereof according to embodiments of the invention.

FIG. 2 illustrates an optical resonant cavity 110 including a bioconjugatable lipid membrane 160 on a surface of the optical resonant cavity 110 according to embodiments, where the optical resonant cavity 110 is part of the optical system 100 of FIG. 1, according to embodiments. The bioconjugatable lipid membrane 160 is functionalized to capture a specific biomolecule or biomolecules 170. The optical resonant cavity 110 may be formed of silica, for example, with the bioconjugatable lipid membrane 160 coating on the surface of the silica.

The bioconjugatable lipid membrane 160 may comprise, for example, at least one of soybean phosphatidylcholine, egg phosphatidylcholine, or synthetic phosphatidylcholine (DOPC, DOPE, POPC). The bioconjugatable lipid membrane 160 may be functionalized with a capture agent for detecting a biomarker. The capture agent may be at least one of an antibody, an aptamer, complementary DNA, or a protein receptor for detecting a biomarker. The capture agent may be specific for capturing Amyloid-β.

Returning to FIG. 1, the signal processing circuit 150 may be configured to determine a presence of the specific biomolecule when captured by the functionalized bioconjugatable lipid membrane 160 based on processing the detection signal from the detector 140. For example, the signal processing circuit 150 may be configured to determine a presence of the specific biomolecule 170 captured by the functionalized bioconjugatable lipid membrane 160 based on processing spectral components of the detection signal. As mentioned above, the resonant light frequency of the optical resonant cavity 110 may be sensitive to particular biomaterials, captured on the surface of the optical resonant cavity 110, where the biomaterials are captured via the functionalized bioconjugatable lipid membrane 160. The spectral components may depend on the transmission of the light beam interacting with the optical resonant cavity 110.

Specific molecules may be detected as follows, for example. A functionalized optical resonant cavity 110 comprising a lipid membrane 160 coating that is functionalized to capture a specific biomolecule 170 is provided. A sample that comprises the specific biomolecule is contacted with the functionalized optical resonant cavity 110. A beam of light is at least partially coupled into said functionalized optical resonant cavity 110 before the contacting. Before the contacting an intensity of the beam of light is detected for each of a plurality of wavelengths after the beam of light has passed the functionalized optical resonant cavity 110 to obtain a first detected spectrum. A beam of light is at least partially coupled into the functionalized optical resonant cavity 110 after the contacting. After the contacting, an intensity of a beam of light for each of a plurality of wavelengths is detected after the beam of light has passed the functionalized optical resonant cavity 110 to obtain a second detected spectrum. Finally, a presence of the specific biomolecule on the optical resonant cavity 110 is determined by comparing the first and the second detected spectra.

The optical resonant cavity 110 may be functionalized for detecting specific biomolecules, for example as follows. An optical resonant cavity, and a plurality of lipid vesicles in a suspension, are provided. The suspension containing the plurality of lipid vesicles is contacted with the optical resonant cavity 110 such that at least some of the lipid vesicles rupture and at least partially coat a surface of the optical resonant cavity 110. The optical resonant cavity 110 may be an optical resonant microcavity and the plurality of lipid vesicles have an ensemble average diameter of at least 50 nm and less than 350 nm. The optical resonant cavity 110 may be an optical resonant microcavity and the plurality of lipid vesicles may have an ensemble average diameter of at least 70 nm and less than 160 nm. The optical resonant cavity 110 may be an optical resonant microcavity and the plurality of lipid vesicles may have an ensemble average diameter of at least 80 nm and less than 120 nm. The providing an optical resonant cavity 110 may provide an array of optical resonant microcavities. The optical resonant cavity 110 may be an optical resonant microtoroid cavity. The array of optical resonant microcavities may be an array of optical resonant microtoroid cavities. The optical resonant cavity 110 may be formed of a hydrophilic material.

EXAMPLES

The following examples describe further details of some embodiments of the current invention. The general concepts of the current invention are not limited to only these particular embodiments.

1. Methods 1.1. Fabrication of Ultrahigh-Q Microtoroids:

Ultrahigh-Q microtoroids were fabricated according to our previously reported method (Su, J., Goldberg, A. F. G., Stoltz, B. Light: Science and Applications (2016) 5). Briefly, silicon wafers coated with 2 μm thermally-grown silica were prepared with Hexamethyldisilazane (HDMS) by evaporation and then spin-coated with Shipley S1813 photoresist. After a softbake of 115° C. for two minutes, the samples were exposed to a UV aligner with a hard mask patterned with arrays of microdisks. The samples were post-baked at 115° C. for 90 seconds then the exposed portions were washed away with Microposit MF-319 developer. Afterwards, the samples were etched in buffered oxide etchant (BOE) for 25 minutes and then quenched in water. The remaining photoresist on the microdisks was vigorously washed with acetone and water. The silicon was etched with an Orbotech Xactix e2 $XeF_2$ etcher to produce standing microdisks. Immediately before experiments, the microdisks were reflowed using a $CO_2$ laser to produce ultrahigh-Q microtoroids.

1.2. Synthesis of Lipid Vesicles

Unilamellar, bioconjugatable phospholipid vesicles were prepared using a film hydration method. Briefly, 1,2-Dioleoyl-sn-glycero-3-phosphocholine (DOPC) in chloroform, 1,2-distearoyl-sn-glycero-3-phosphoethanolamine-N-[succinyl(polyethylene glycol)-2000] (DSPE-$PEG_{2000}$-Succinyl) (5% molar ratio) were mixed in a glass vial. The solvent was evaporated with a stream of argon gas and lyophilized for a minimum of 2 hours. The resultant dried lipid mixture was then rehydrated in 1 ml degassed water. Samples were then subjected to 10 freeze-thaw-vortex cycles in warm water (42° C.) and dry ice/isopropanol (−77° C.), followed by 21 time-extrusions through a two-stacked 200 nm Nuclepore polycarbonate filters using a stainless steel extruder (Avanti Polar Lipids). For fabricating fluorescent lipid vesicle, a 2% molar ratio of Liss Rhod PE lipid was doped into DOPC lipid. Size distribution was measured using a dynamic light scattering (DLS) system (Zetasizer Nano S, Malvern Instruments, UK). Transmission Electron Microscope (TEM) images were taken using uranyl acetate (2%) negative staining technique.

1.3. Forming Lipid Coated Microtoroid by Vesicle Rupture and Subsequent Antibody Bioconjugation:

Freshly-reflowed microtoroids were challenged with 200 μg of the as-prepared DOPC vesicles and the substrate were shaken at room temperature for 1 hour, vigorously washed with degassed water and kept in water until bioconjugation took place. For antibody immobilization, carbodiimide crosslinker chemistry was employed for coupling the carboxylate groups of the lipid coated microtoroids to the amine groups on the antibody [13]. Typically, 100 mM 1-ethyl-3-(3-dimethylaminopropyl) carbodiimide (EDC) and 30 mM N-hydroxysuccinimide (NETS) were freshly prepared and loaded onto lipid coated toroids and incubated for 15 minutes to activate carboxylate groups, 5 μg amyloid-β 1-42 antibody prepared in PBS buffer was loaded onto the chip and immobilization took place at room temperature for 1 hour. One percent BSA solution was used to quench the reaction and also to block non-specific binding onto the silicon substrate. The chip was filled with PBS buffer and ready for biosensing.

1.3.1. Amyloid-β 1-42 Detection Using Microtoroid Coupled Optical Fiber:

A tapered optical fiber was pulled starting with a single mode fiber (Thorlabs SM600). A small portion of the fiber jacket was mechanically stripped. The fiber was then placed into a custom-made, motorized fiber pulling stage which pulls the two ends of the stripped fiber over a hydrogen flame. The hydrogen flow rate was adjusted so that the flame height was just below the fiber and the fiber was slowly pulled to a visually optimal diameter. The microtoroid chip was affixed to a stainless-steel sample holder using super glue. A sample chamber was constructed on top of the sample holder by cantilevering a custom cut coverslip over a microscope slide spacer and gluing it in place with super glue. Different concentrations of Amyloid-β 1-42 peptide were freshly prepared in degassed, filtered PBS buffer, and then sequentially flowed onto the microtoroid chip starting from the lowest concentration. After injection, there was a 60-s delay before data recording. Data was recorded at 20 kHz using a 24-bit data acquisition card (NI-PCI-4461) from National Instruments. Following data acquisition, Fourier filtering was performed to remove 60 Hz and its harmonics (electronic line noise), 100 Hz (laser noise), and 2 kHz (dither frequency). A median filter of window size 1001 was then applied.

Results and Discussion

Figure 3:
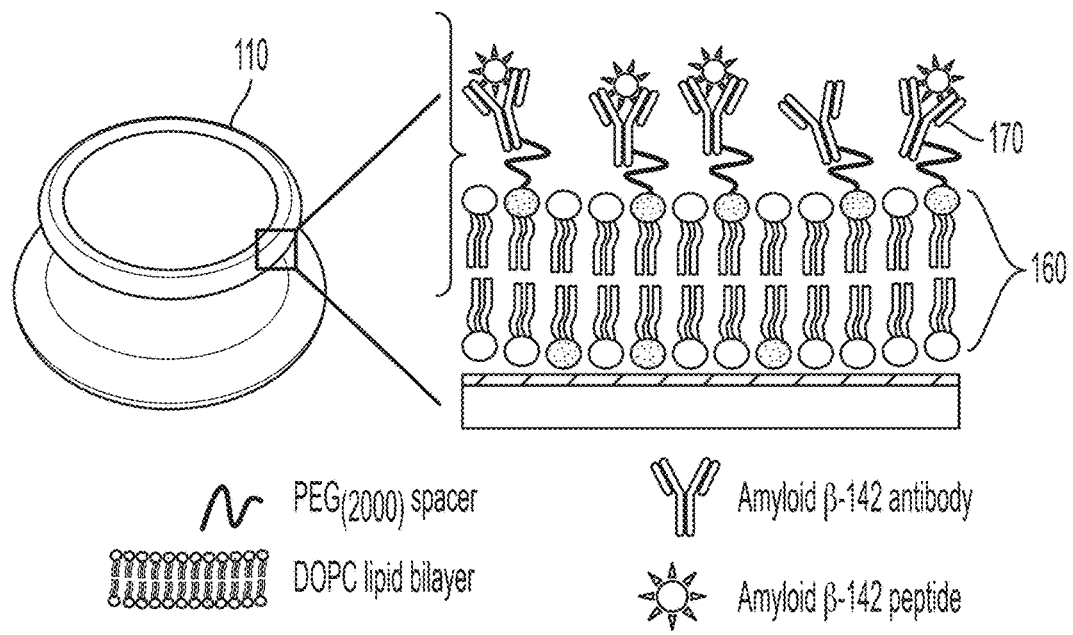
FIG. 3 is a schematic diagram of lipid functionalization onto a microtoroid using vesicle fusion technique. The DOPC (1,2-dioleoyl-sn-glycero-3-phosphocholine) lipid membrane was doped with 5% (molar ratio) of DSPE-$PEG_{2000}$-Succinyl to enable antibody bioconjugation using EDC/NHS chemistry.

FIG. 3 shows a schematic diagram of microtoroid optical resonators functionalized with carboxylated lipid membrane for Amyloid-β 1-42 detection. The carboxylated lipid, $DSPE-PEG_{2000}$-Succinyl, leaves a PEG spacer that can enhance detection sensitivity by providing a degree of flexibility to reduce steric hindrance. Besides directly using the EDC/NHS non-oriented antibody immobilization approach, one may use Protein G or alternative amine reactive linkers to orient the Fc-specific antibody immobilization. In this study, to firstly demonstrate the efficiency of lipid-based bioconjugation onto the microtoroid surface, we focus mainly on increasing the microtoroid stability and extending real-time detection of Amyloid-β 1-42.

Figure 4A:
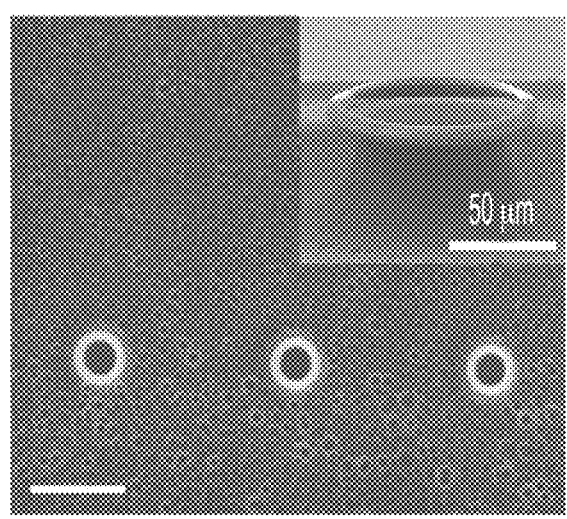
FIG. 4A is a scanning electron microscope (SEM) image of an array of microtoroids on a silicon substrate (top view), where the inset picture shows a typical microtoroid disk-structure.
Figure 4B:
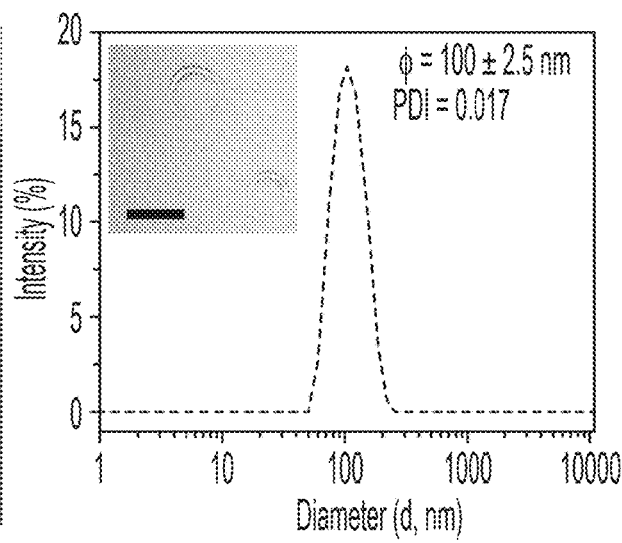
FIG. 4B is a Transmission Electron Microscope (TEM) image of an as-prepared DOPC vesicle using a freeze-thaw method (inset where the scale bar is 100 nm), and further provides an average size measurement of a DOPC vesicle measured by a dynamic light scattering (DLS) method.

The Q-factors of several microtoroids were measured using tapered fiber coupling [1]. FIG. 4A shows the representative scanning electron microscopy (SEM) image of an array of three microtoroid disk-structures, where the inset picture shows a typical microtoroid on silicon substrate. FIG. 4B (inset with 100 nm scale bar) shows the transmission electron microscope (TEM) image of negative stained lipid vesicle structures. The size measured from TEM shows a close correlation with DLS data in FIG. 4B, where an average size of a lipid vesicle is 150 nm.

Figure 5A:
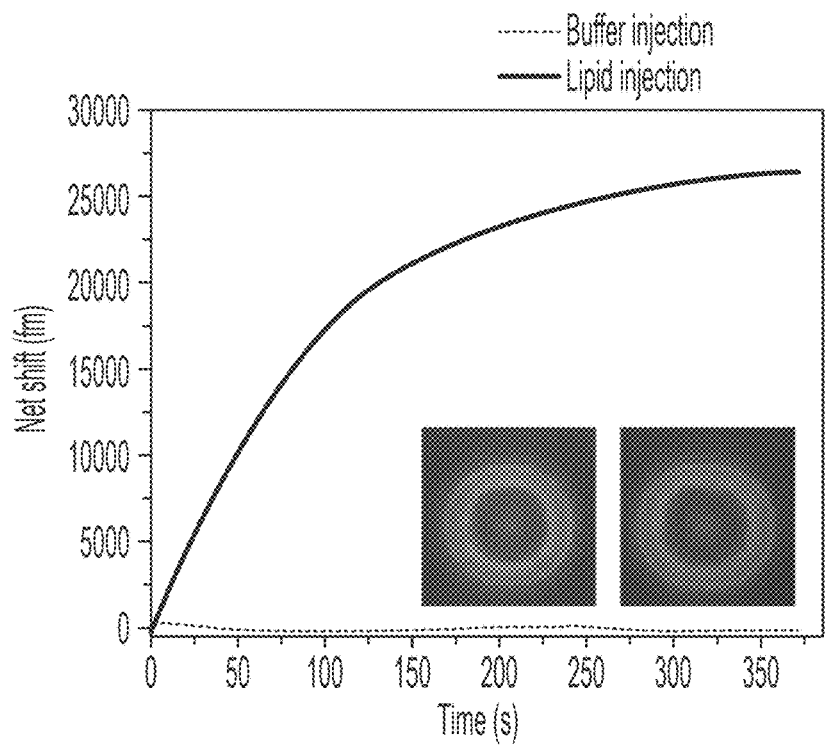
FIG. 5A illustrates the lipid coating processed was adaptively tracked in real-time, inducing a significant wavelength shift of approximately 25 picometer compared to buffer injection, and the inset picture shows fluorescent images of microtoroid cavity after lipid coating process.
Figure 5B:
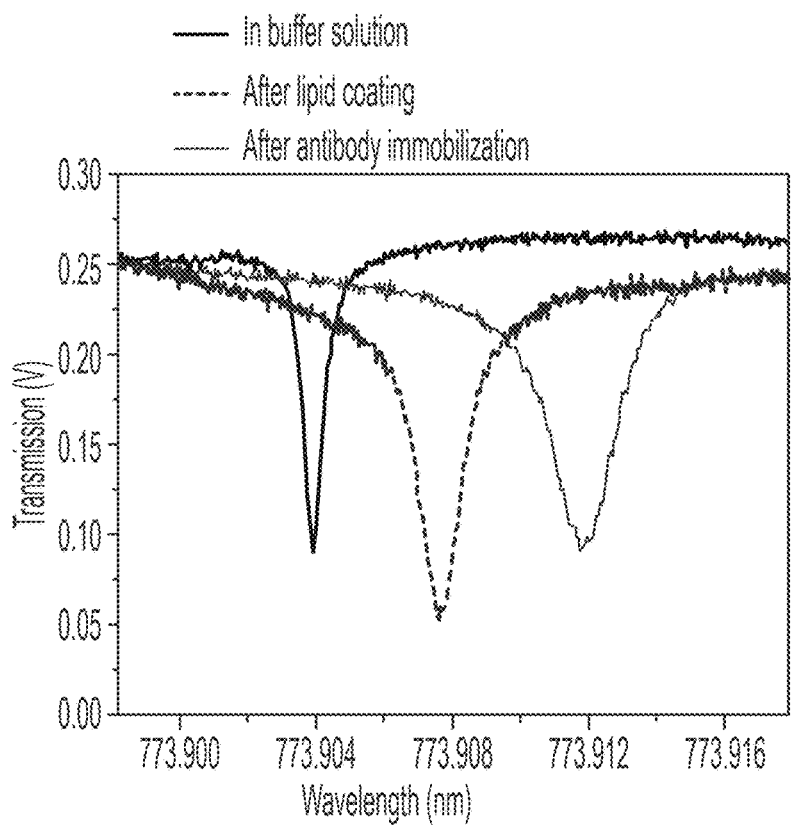
FIG. 5B illustrates the resonant wavelength shift after each step of functionalization.
Figure 5C:
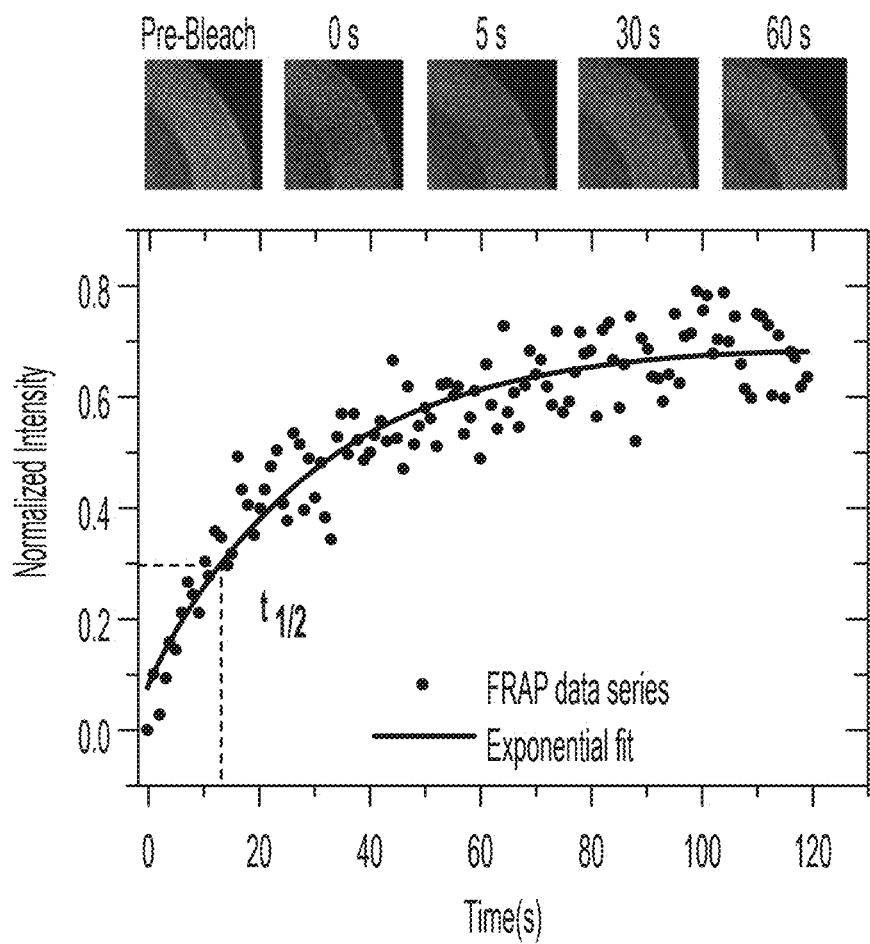
FIG. 5C illustrates fluorescent recovery after photobleaching data with retained ~77% lipid fluidity and a diffusion coefficient of D of $3.378\pm0.2559$ $\mu m^2$ $s^{-1}$ which falls within the range of 1 to 4 $\mu m^2$ $s^{-1}$ typically observed in supported lipid bilayer formed on glass support.

Vesicle rupture technique has been investigated to form a mobile lipid bilayer coating a gold surface [19]. When the vesicle approaches the planar and grating support at the same time, the strong affinity between the support and lipid membrane cause the vesicle deformity upon vesicle bilayer bending tension. We propose that the microtoroid arrays also exhibit a "grating structure" which will benefit the vesicle rupturing process. The successful formation of a lipid membrane on a microtoroid was characterized by confocal microscopy using Rhodamine lipid doped DOPC (FIG. 5A, inset). The confocal fluorescent image (FIG. 5A, inset) shows perfect coverage of the lipid membrane onto a microtoroid structure with a preference towards the reflowed edge, which is important where real-time detection occurs [2]. To confirm the membrane fluidity on microtoroid support, fluorescence recovery after photobleaching (FRAP) technique was used to bleach a defined spot on microtoroid for a very short time. FIG. 5A illustrates the lipid coating processed was adaptively tracked in real-time, inducing a significant wavelength shift of approximately 25 μm compared to buffer injection, and the inset picture shows fluorescent images of microtoroid cavity after lipid coating process. FIG. 5B illustrates the resonant wavelength shift after each step of functionalization. FIG. 5C illustrates fluorescent recovery after photobleaching data with retained ~77% lipid fluidity and a diffusion coefficient of D of $3.378\pm0.2559$ $\mu m^2$ $s^{-1}$ which falls within the range of 1 to 4 $\mu m^2$ $s^{-1}$ typically observed in supported lipid bilayer formed on glass support.

A FRAP analyzing plugin in Fiji software was used to extract the mobility data. The mobility of a lipid membrane is an important indicator of its fluidity. If the fluorescent labeled-lipid is mobile, the bleached molecules leave and unbleached molecules translocate to the illuminated region, resulting in recovered fluorescent intensity. The results showed that the lipid membrane retained more than 77% fluidity, the fluorescence half-life recovery was 16.69 seconds. This lipid mobility result on the microtoroid substrate demonstrated an effective label-free strategy of detecting membrane binding events in a real-time manner.

Figure 6A:
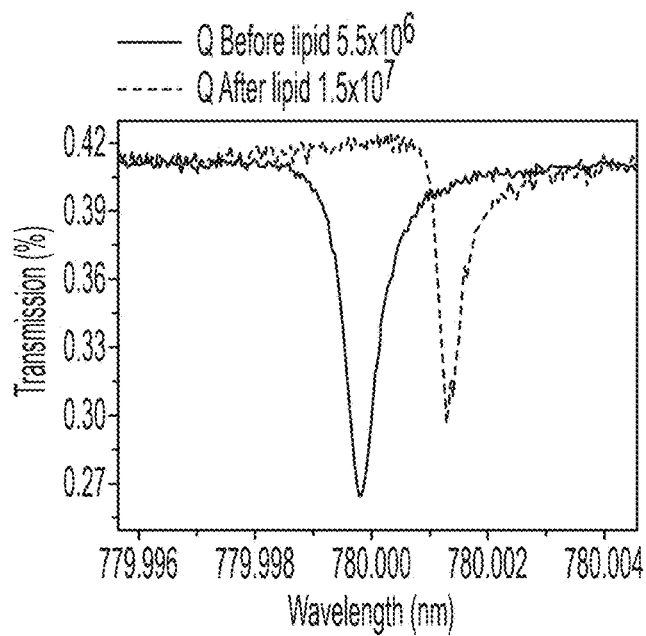
FIG. 6A illustrates transmission of a microtoroid before and after lipid functionalization. Lipid functionalization induced a significant shift in resonant wavelength and mode splitting was observed.
Figure 6B:
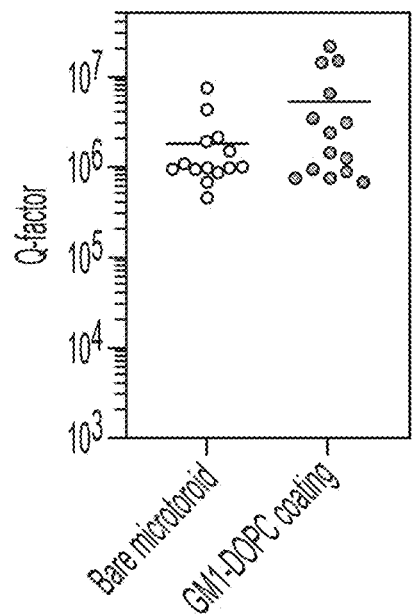
FIG. 6B illustrates a Q value calculated based on Lorentzian fit of the sharpest peak.
Figure 6C:
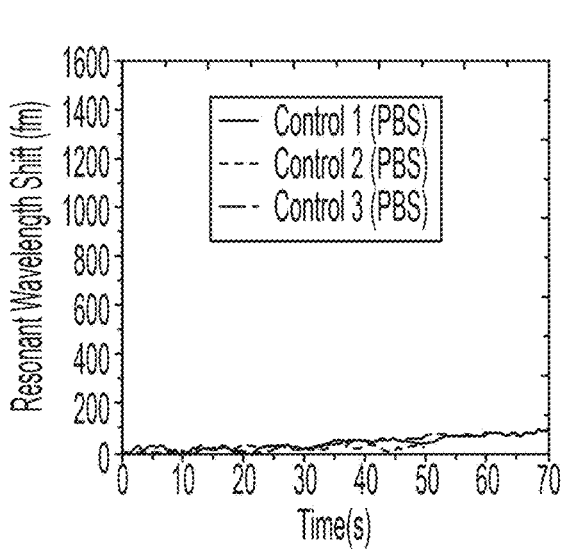
FIG. 6C illustrates a binding curve for three separate measurements of PBS control prior to loading the sample.
Figure 6D:
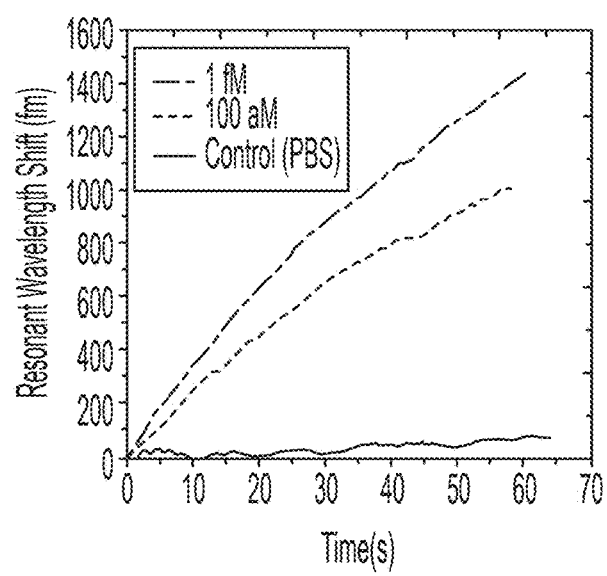
FIG. 6D illustrates a binding curve of Amyloid-β at concentrations of 100 aM and 1 fM.

FIG. 6A illustrates transmission of a microtoroid before and after lipid functionalization. Lipid functionalization induced a significant shift in resonant wavelength and mode splitting was observed. FIG. 6B illustrates a Q value calculated based on Lorentzian fit of the sharpest peak. FIG. 6C illustrates a binding curve for three separate measurements of PBS control prior to loading the sample. FIG. 6D illustrates a binding curve of Amyloid-β at concentrations of 100 aM and 1 fM.

After antibody functionalization, the lipid functionalized microtoroid retained a high Q-factor which is sufficient for biodetection (FIG. 6B). The methodology proposed herein shows a significant enhancement (See FIG. 6B) compared to the previous report where the lipid membrane decreased the Q-factor of a microsphere by two orders of magnitude [13].

Two concentrations of Alzheimer's biomarker, Amyloid-β 1-42, were sequentially flowed onto the lipid-microtoroid system and the binding events were tracked over a minute. A great advantage of using microtoroid chips for biodetection is that the binding events can be tracked in real-time, providing an invaluable resource for device-based ultrasensitive biosensing. The lipid-based surface functionalization provides an excellent uniformity to greatly enhance the sensitivity of microtoroid chip. Our results show that we can detect 100 aM of Amyloid-β (FIG. 6C, 6D), which is several orders of magnitude lower than a previously reported method [12, 14, 15], with a significant reduction in time (three minutes per sample compared to three hour using ELISA assay) [16] and is label-free [17, 18]. In addition, the analyte binding was stably tracked for up to 70 seconds, which deserves great attention for developing a real-time binding assay similar to well-known SPR technique.

Figure 7:
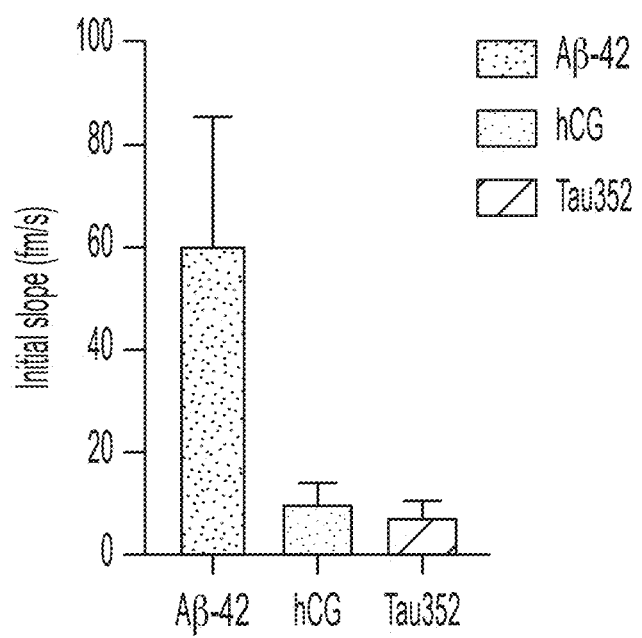
FIG. 7 illustrates the specificity of Aβ-42 detection over irrelevant proteins such as hCG and Tau352. The investigated concentration for the irrelevant binding experiment was 100 pM.

FIG. 7 illustrates the specificity of Aβ-42 detection over irrelevant proteins such as hCG and Tau352. The investigated concentration for the irrelevant binding experiment was 100 pM. The results show a good specificity of Aβ-42 detection.

Figures 8A, 8B:
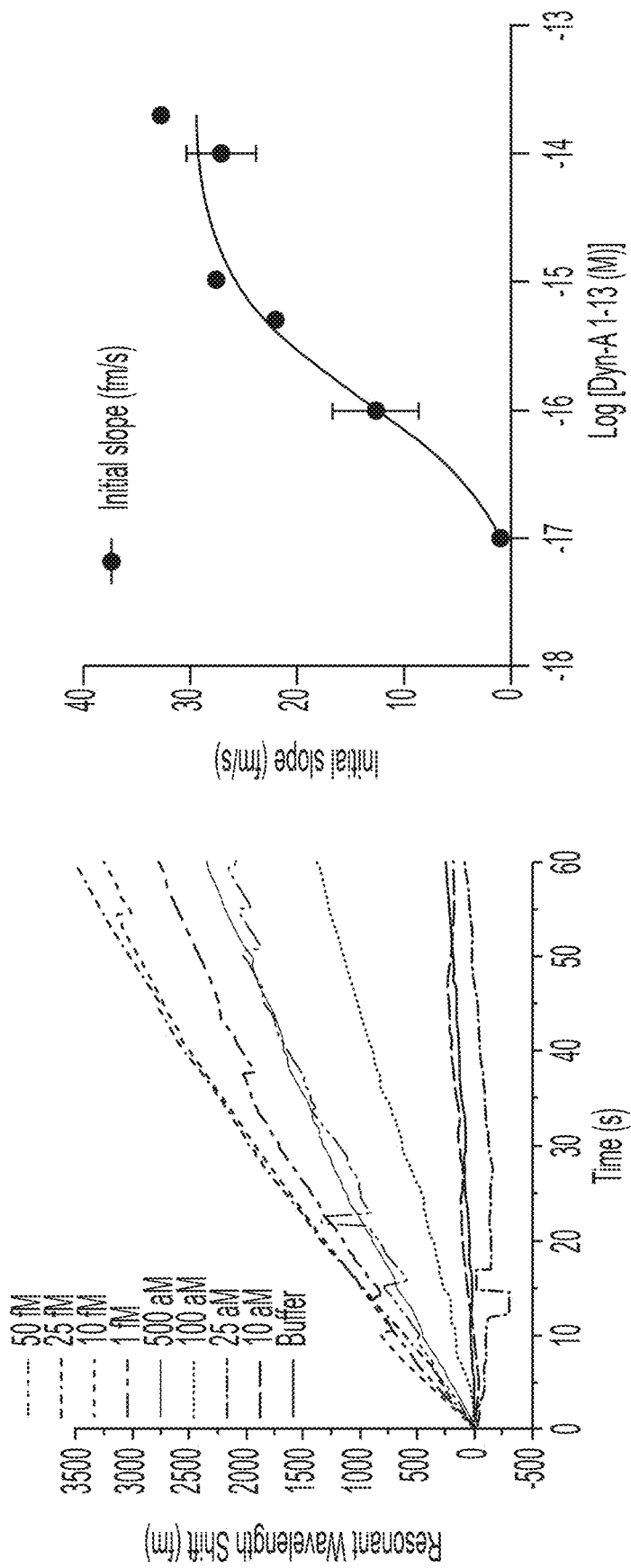
FIGS. 8A and 8B illustrate the detection of Dynorphin A binding to Kappa Opioid Receptor (KOR) reconstituted lipid coated microcavity.

FIGS. 8A and 8B illustrate the detection of Dynorphin A binding to Kappa Opioid Receptor (KOR) reconstituted lipid coated microcavity. FIG. 8A illustrates a real time kinetic response of increasing Dynorphin A concentrations as a function of resonant wavelength shift. FIG. 8B illustrates a dose-response curve of Dynorphin A binding to KOR proteolipid coated microcavity (average data from two consecutive recordings).

Figure 9:
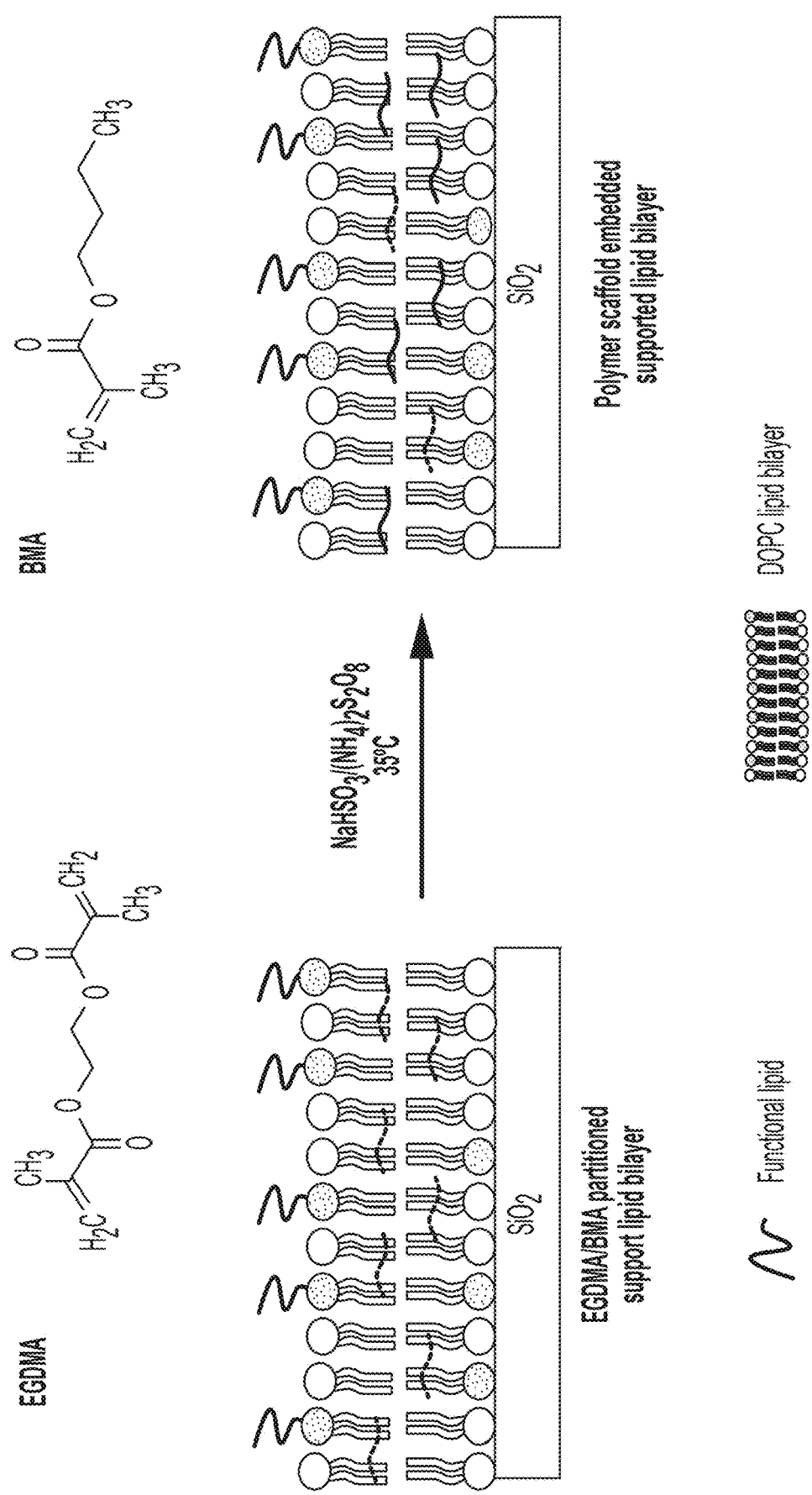
FIG. 9 illustrates stabilization of lipid coating on a microcavity using a methacrylate redox polymer scaffold.

In some embodiments, the bioconjugatable lipid membrane is stabilized using a methacrylate redox polymer scaffold. For example, FIG. 9 illustrates stabilization of lipid coating on a microcavity using a methacrylate redox polymer scaffold.

The examples show that a smooth and uniform unilamellar lipid membrane was successfully prepared on a microtoroid support and the toroid chip still retained a high quality (Q)-factor for ultrasensitive detection with significant reduction in time, demonstrated by highly-sensitive, label-free detection of Amyloid-β, Alzheimer's biomarker, with a detection time within several minutes down to attomole level. This methodology not only holds great promise in further advancement of automatic, high-throughput sensing platforms but also provides a powerful technique for preparing optical microcavities with transmembrane elements to study membrane interaction in a real-time manner, therefore more fundamental aspects of cellular signaling and cell functions could be further discovered.

The formation of lipid membranes onto a microtoroid support enables a versatile bioconjugation technique that can enhance the sensitivity and stability for an ultrasensitive detection assay. According to our knowledge, a lipid membrane-based bioconjugation technique has not been investigated in surface chemistry of an optical microcavity, with a main focus on microtoroid optical resonators. The lipid-based coated microcavity provides an excellent surface uniformity and an anti-fouling effect that can significantly enhance the current sensitivity level of optical microcavities. According to some embodiments, there is provided a novel method of microtoroid surface functionalization using a unilamellar lipid membrane prepared by vesicle rupture technique to form a unilamellar, mobile lipid bilayer coated microtoroid. The proposed microcavity conjugation platform is versatile and independent of the commonly-used biotinylation system. The lipid coated toroid was further applied as a covalent bioconjugation platform for ultrasensitive detection of Amyloid-β 1-42 peptide, an important biomarker for early diagnosis of Alzheimer's disease.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

REFERENCES

[1] Su, J., Goldberg, A. F. G., Stoltz, B. Light: Science and Applications (2016) 5.
[2] Vollmer, F., Arnold, S., Nature Methods. (2008) 5.
[3] Repovsky, D., Edward, J., Palszegi, T., Slobodnik, M., Velic, D., Chem Phys Chem (2013) 21, 3569-80.
[4] Howarter, J. A., Youngblood, J. P., Langmuir (2006), 22, 11142-11147.
[5] Kulkarni, S. A., Ogale, S. B., Vijayamohanan, K. P., J. Colloid and Interface Science, 318, 372-379.
[6] Eske, L. D., Galipeau, D. W., Colloids and Surface A: Physicochemical and Engineering Aspects (1999), 154, 33-51.
[7] Rodriguez-Franco, P., Abad, L. I., Munoz-Pascual, F. X., Moreno, M., Baldrich, E. Sensors Actuators B: Chemical (2014), 191, 634-643.
[8] Puu, G., Gustafson, I. *BBA Biomembranes* (1997) 2, pp 149-161.
[9] Andersson, A. S., Glasmastar, K., Sutherland, D., Lidberg, U., Kasemo, B. J Biomed Mater Res A, 64A (2003), pp. 622-629.
[10] V. A. Tegoulia, W. S. Rao, A. T. Kalambur, J. R. Rabolt, S. L. Cooper. Langmuir, 17 (2001), pp. 4396-4404.
[11] N. C. Hartman, J. A. Nye, J. T. Groves. P Natl Acad Sci USA, 106 (2009), pp. 12,729-12,734
[12] Yoo, Y. K., Kim, J., Kim, G., Kim, Y. S., Kim, H. Y., Lee, S., Cho, W. W., Kim, S., Lee, S. M., Lee, B. C., Lee, J. H., . . . Hwang, K. S. (2017). Scientific reports, 7(1), 8882. doi:10.1038/s41598-017-09370-3
[12] Rama, E. C., Gonzalez-Garcia, M. B., Costa-Garcia, A. Sensors Actuators B: Chemical (2014), 567-571.
[13] Sun, V., Armani, A. M. Appl. Phys. Lett. (2015), 106, 071103.
[14] Fischer, M. J., Methods Mol. Biol. (2010), 627, 55-73.
[15] Englund H, Sehlin D, Johansson A S, Nilsson L N, Geller-fors P, Paulie S, Lannfelt L, Pettersson F E. J. Neurochem (2007), 103, 334-345.
[16] van Helmond Z., Heesom K., Love S. J Neurosci. Methods (2009), 176, 206-212.
[17] Santos, A. N., Torkler, S., Nowak, D., Schlittig, C., Goerdes, M., Lauber, T., Trischmann, L., Schaupp, M, Penz, M, Tiller, F. W., Bohm, G. J Alzheimers. Dis. (2007), 11,117-125.
[18] Santos A N, Simm A, Holthoff V, Boehm G. J Alzheimers Dis, (2008), 14,127-131.
[19] Peng, P. Y., Chiang, P. C., Chao, L. S. Langmuir (2015), 31 (13), 3904-3911.

We claim:

1. An optical system for detecting specific biomolecules, comprising:
   an optical resonant cavity;
   a lipid membrane formed on at least a portion of a surface of said optical resonant cavity;
   an optical source arranged to provide a source beam of light to be at least partially coupled into said optical resonant cavity;
   an optical detector arranged to detect light from said source beam of light after said source beam of light has coupled into said optical resonant cavity to provide a detection signal; and
   a signal processing circuit configured to communicate with said optical detector to receive said detection signal,
   wherein said signal processing circuit is further configured to process said detection signal to determine at least a resonance wavelength of said optical resonant cavity during operation.

2. The optical system according to claim 1, wherein said optical resonant cavity and said lipid membrane have a quality factor (Q) of at least $10^4$.

3. The optical system according to claim 1, wherein said optical resonant cavity is a microtoroid optical resonant cavity and said optical source comprises an optical waveguide configured to couple light into said microtoroid optical resonant cavity by evanescent fields.

4. The optical system according to claim 1, wherein said lipid membrane is a stabilized lipid membrane.

5. The optical system according to claim 1, wherein a G-protein coupled receptor (GPCR) is incorporated in the lipid membrane.

6. The optical system according to claim 1, wherein said optical resonant cavity comprises silica.

7. The optical system according to claim 1, wherein said lipid membrane comprises at least one of soybean phosphatidylcholine, egg phosphatidylcholine, or synthetic phosphatidylcholine (DOPC, DOPE, POPC).

8. The optical system according to claim 1, wherein said lipid membrane is functionalized with a capture agent for detecting a biomarker.

9. The optical system according to claim 8, wherein said capture agent is at least one of an antibody, an aptamer, complementary DNA, or a protein receptor for detecting a biomarker.

10. The optical system according to claim 8, wherein said capture agent is specific for capturing Amyloid-β.

11. The optical system according to claim 8, wherein said signal processing circuit is further configured to determine spectral components of said detection signal.

12. The optical system according to claim 1, wherein said lipid membrane is a lipid bilayer.

* * * * *